No. 764,406. Patented July 5, 1904.

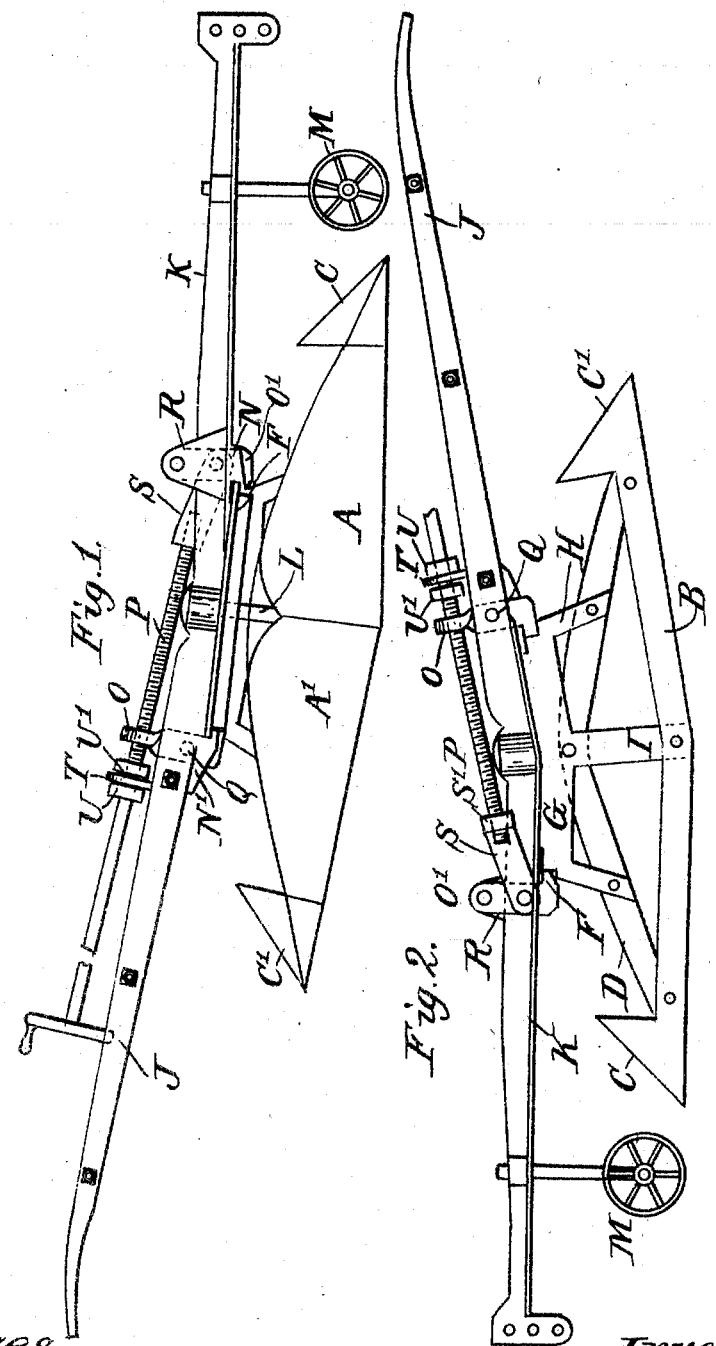

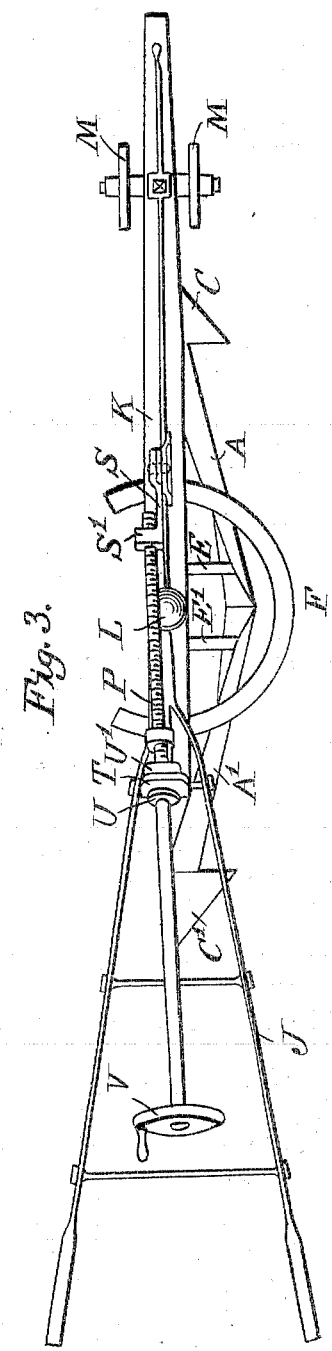

UNITED STATES PATENT OFFICE.

EDMUND JOHNSTONE WILSON, OF JEETHO, VICTORIA, AUSTRALIA.

REVERSIBLE PLOW.

SPECIFICATION forming part of Letters Patent No. 764,406, dated July 5, 1904.

Application filed November 23, 1903. Serial No. 182,399. (No model.)

*To all whom it may concern:*

Be it known that I, EDMUND JOHNSTONE WILSON, a subject of the King of Great Britain, residing at Jeetho, in the State of Victoria and Commonwealth of Australia, have invented certain new and useful Improvements in Reversible Plows, of which the following is a specification.

My invention has been devised for the purpose of producing a reversible plow mainly for hillside-work, but which will do as effective work on level ground as any plow. When used for the latter class of work, it can be used as an ordinary plow, in which case the reversing-gear is not utilized; but if it is desired to save both time and labor the plowman can when he reaches the end of a furrow by reversing the plow return along the same furrow, thus avoiding the necessity of going from land to land, with the result that the field is left without furrows, which when these are not required for drainage purposes is a decided advantage, as will be obvious to every practical man.

According to my invention the body of the plow is double—that is, it has two moldboards end on to one another—and a sole-plate extending the whole length of the moldboards and having a share at either end, so that one share is capable of making a left-handed cut and the other a right-handed cut. The two parts of the body are set at such an angle the one to the other that when the plow is in use the rear half of the body is clear of the ground, and consequently does not interfere in any way with the draft. The frame of the body consists of an arched angle-iron beam, which is connected at each end to the sole-plate just at the rear of each share. To the top of and about the center of the arched beam is attached a practically semicircular turn-table, the ends of which are connected by a bridge-piece which at all points is parallel with the sole-plate, thus insuring that the beam, which is made integral with the handles and which is pivoted at the center of the bridge-piece and is free to revolve thereon, is parallel with that portion of the body over which it for the time being projects. The bridge-piece is bolted both to the arched beam and the sole-plate. The beam and handles are guided on the turn-table by means of jaws on the under side thereof, which engage with the under side of the turn-table. In order to lock the beam and handles upon the turn-table, I provide both with clutches which are operated by a screwed rod which extends backward above and between the handles, said rod being provided with a wheel for easily operating it.

In order that my invention may be clearly understood, I will now refer to the annexed drawings, in which—

Figure 1 is an elevation of one side of a single-furrow plow embodying my improvements, and Fig. 2 is an elevation of the other side. In each of these views one of the shares is shown in the act of entering the ground, the other share being clear of the ground. Fig. 3 is a plan.

Similar letters refer to similar parts throughout the several views.

A A' are the double moldboards end on to one another, and B is a sole-plate extending the whole length of the two moldboards A A' and having a share C at either end. In the drawings these shares are shown as integral with the sole-plate; but it is obvious that removable shares may be used, if desired. As will also be seen from the drawings, the body is so constructed that when share C is in operation the rear half of the body is clear of the ground, and consequently does not in any way interfere with the draft or leverage of the handles, and, moreover, gives the operator perfect command of the plow owing to the accurate balance of the body.

D is an arched angle-iron beam the ends of which are connected to the sole-plate B just at the rear of each share C C'.

E E' are stays between the moldboards A A' and the sole-plate B.

F is a practically semicircular turn-table, the ends of which are connected by means of a bridge-piece G, which, as will be seen, is parallel at all points with the sole-plate B, thus insuring, as previously pointed out, that the beam K shall always be parallel with that portion of the body which is in use. The bridge-piece G is attached at either end to the arched beam D by means of stays H, and in the center also by means of a bolt.

I is a central vertical support formed integral with the bridge-piece and bolted at the foot to the sole-plate B.

J represents the handles, and K the beam, of the plow, which are integral the one with the other and are pivoted to the arched beam D by means of a bolt or stud L.

M represents the land-wheels.

N N' are jaws on the beam K and handles J, respectively, which engage with the under side of the turn-table F and act as guides for the beam and handles.

O O' are clutches, and P is a screwed rod to operate said clutches. Clutch O is pivoted at Q, and its top end is screwed to take the screwed rod P, and its bottom end is formed in the shape of a hook to engage with the under side of the turn-table. Clutch O', which, like clutch O, is also provided at its bottom end with a hook, is pivoted at its top end to a projection R on the beam K and has a link S connected to it, and through a screwed hole in a projection S' on the side thereof passes the free end of the screwed rod P. Immediately behind clutch O is a bracket T, which acts as a support for the rod P, and on one side of this bracket on the rod P is a collar U, and on the other side is a nut U', which prevents any backward or forward movement of the rod P.

V is a wheel on the end of rod P for convenience in operating it.

As will be readily understood, when rod P is rotated the clutches O O' are forced inward or outward, according to the direction which the rod is turned, thereby fastening or unfastening the beam and handles to the body of the plow, as may be desired.

The mode of operation is as follows: The clutches O O' are first brought into engagement with the turn-table F by rotating the screwed rod P through the intervention of the wheel V, thus securely locking the beam and handles to the body. When the plow has completed a furrow, the plowman turns the screwed rod P, thus releasing the clutches, when the handles and beam can be revolved on the turn-table, being guided thereon by the jaws N N', the horses which are attached to the beam turning with it. The clutches O O' are then brought into engagement with the turn-table F, and the plow is then ready to return back along the furrow previously cut.

Although I have shown my improvements as applied to a single-furrow plow, it will be obvious that they can be equally well applied to a double-furrow plow, the only alteration necessary being that the double bodies are attached to a frame which also carries the beam and handles and the turn-table upon which they revolve and in lieu of the clutches engaging with the turn-table they engage with radius-bars at either end of the frame.

Having now particularly described and ascertained the nature of my said invention and in what manner the same is to be performed, I declare that what I claim is—

1. In reversible plows, a double body consisting of two moldboards, a sole-plate extending from end to end of said double body and having a share at each of its ends, a turn-table having a bridge-piece secured to the sole-plate, a beam having handles rotatably connected to the turn-table, jaws pivoted to the beam, a rotatable member engaging the jaws, for actuating the same.

2. In reversible plows the combination with the beam K handles J and turn-table F of the jaws N N' clutches O O' and screwed rod V for operating said clutches substantially as described.

3. In reversible plows, the combination of a plow-section having moldboards and a turn-table, a beam having handles connected thereto, said beam being rotatably connected to said turn-table, jaws pivoted to the beam for engaging the turn-table, and a longitudinally-immovable member engaging the jaws and for actuating the same.

4. A reversible plow consisting of a beam having handles at one end thereof, a bridge-piece including a turn-table rotatably connected to said beam, clutch members engaging said turn-table, a screw-threaded longitudinally-immovable rod engaging the said members for actuating the same, an arched beam connected to said bridge-piece, a sole-plate secured to the arched beam, and moldboards fastened to the sole-plate, substantially as described.

5. A reversible plow consisting of a beam having handles at one end thereof, a bridge-piece including a turn-table rotatably connected to said beam, clutch members pivotally connected to the beam and adapted to engage with the turn-table, a rotatable screw-threaded rod longitudinally immovable engaging the said clutch members for actuating the same, an arched beam secured to said bridge-piece, a sole-plate connected to said arched beam and arranged in alinement with said bridge-piece, and mold members fastened to said sole-plate, substantially as described.

In testimony whereof I have hereunto set my hand in presence of two subscribing witnesses.

EDMUND JOHNSTONE WILSON.

Witnesses:
WALTER S. BAYSTON,
FRANK BAYSTON.